United States Patent [19]

Victor et al.

[11] Patent Number: 5,368,314

[45] Date of Patent: * Nov. 29, 1994

[54] CONTACTLESS PRESSURIZING-GAS SHAFT SEAL

[75] Inventors: Karl-Heinz Victor, Castrop-Rauxel; Hans-Wilhelm Laarmann, Hamm; Ralf Dedeken, Witten-Heven; Gustav Maser, Dortmund, all of Germany

[73] Assignee: Pacific Wietz GmbH & Co. KG, Dortmund, Germany

[*] Notice: The portion of the term of this patent subsequent to Mar. 3, 2009 has been disclaimed.

[21] Appl. No.: 971,150

[22] Filed: Nov. 3, 1992

Related U.S. Application Data

[63] Continuation-in-part of Ser. No. 869,218, Apr. 13, 1992, abandoned, which is a continuation of Ser. No. 622,866, Dec. 5, 1990, abandoned, which is a continuation-in-part of Ser. No. 491,664, Mar. 9, 1990, Pat. No. 5,092,612, which is a continuation-in-part of Ser. No. 115,063, Oct. 28, 1987, abandoned.

[30] Foreign Application Priority Data

Oct. 28, 1986 [DE] Germany ............... 3636708
Dec. 6, 1989 [DE] Germany ............... 3940258

[51] Int. Cl.$^5$ ............................................. F16J 15/34
[52] U.S. Cl. .................................................. 277/96.1
[58] Field of Search ............. 277/28, 29, 84, 92, 277/96, 96.1, 96.2, 134

[56] References Cited

U.S. PATENT DOCUMENTS

| | | | |
|---|---|---|---|
| 3,383,116 | 5/1968 | Carter | 277/96.1 |
| 3,527,465 | 9/1970 | Guinard | 277/96.1 X |
| 3,695,789 | 10/1972 | Jansson | 277/96.1 X |
| 3,744,805 | 7/1973 | Heinrich | 277/96.1 |
| 3,957,276 | 5/1976 | Wiese | 277/96.1 X |
| 4,099,729 | 7/1978 | Nylykke | 277/96.1 |
| 4,212,475 | 7/1980 | Sedy | 277/96.1 |
| 4,335,888 | 6/1982 | Ohba et al. | 277/96.1 |
| 4,635,946 | 1/1987 | Stanley | 277/134 |
| 5,092,612 | 3/1992 | Victor et al. | 277/96.2 X |

FOREIGN PATENT DOCUMENTS

| | | | |
|---|---|---|---|
| 0574210 | 4/1933 | Germany | 277/96.1 |
| 0779695 | 11/1980 | U.S.S.R. | 277/96.1 |
| 1645689 | 4/1991 | U.S.S.R. | 277/96.1 |
| 1707372 | 1/1992 | U.S.S.R. | 277/96.1 |

*Primary Examiner*—William A. Cuchlinski, Jr.
*Assistant Examiner*—John L. Beres
*Attorney, Agent, or Firm*—Herbert Dubno

[57] ABSTRACT

A high pressure sealing arrangement of the type in which a rotor sealing ring end face defines a gas pressure with a stator sealing ring end face has a functional gap between a cylindrical portion of the seal housing and the stator sealing ring bridged by an O-ring of reduced hardness. The polar or geometric moment of inertia of the stator sealing ring is sufficiently large that the gap width of the functional annular gap between the shaft-side cylindrical part of the sealing ring in the operational state and under the operational differential pressure corresponds to the structurally predetermined gap width of the mounting ring gap between the cylindrical part of the sealing housing and the stator sealing ring in all operational states and is less than 0.4 mm and preferably less than 0.3 mm. The sealing O-ring additionally serve as a compensation or centering ring and, for this purpose, has a material hardness which is greater than the extrusion threshold of this material through the gap and for the given gap width at the predetermined operating pressure differential and is less than a hardness of 90 Shore A according to German Industrial Standard DIN 53505 preferably the hardness of the O-ring is less than 80 Shore A under this standard. In other words according to the invention the parts are related and dimensioned that the orientations of the sealing end faces of the rotor sealing ring and the stator sealing ring do not change in operation and preferably are always parallel.

10 Claims, 7 Drawing Sheets

CONTACTLESS PRESSURIZING-GAS SHAFT SEAL

CROSS REFERENCE TO RELATED APPLICATIONS

This application is a continuation-in-part of our copending application 07/869,218 filed Apr. 13, 1992 (now abandoned) as a continuation of Ser. No. 07/622,866 (now abandoned) filed 5 Dec. 1990 as a continuation in part of Ser. No. 07/491,664 filed 9 Mar. 1990 (now U.S. Pat. No. 5,092,612) as a continuation-in-part of Ser. No. 07/115,063 filed 28 Oct. 1987 (now abandoned).

FIELD OF THE INVENTION

Our present invention relates to a gas-pressurizing and gas-blocking contactless seal for a shaft and is adapted to be disposed between the shaft and the housing to block fluid passage therebetween while maintaining a sealing gap which has only gas pressure bridging between the sealing ring elements which are relatively rotatable.

BACKGROUND OF THE INVENTION

A gas-blocking contactless seal for a shaft can comprise a sealing housing surrounding the shaft, a stator seal ring disposed in the housing and a rotor sealing ring mounted on the shaft.

The two sealing rings have juxtaposed end faces separated by the sealing gap in which the relative rotation of the rings generates a gas pressure sufficient to seal between the housing and the shaft.

As described, for instance in U.S. Pat. No. 5,092,612, for example, the rotor sealing ring can be composed of a material of a high thermal conductivity and high modulus of elasticity as well as of high hardness. The sealing gap can be defined between the stator sealing ring and a rotor sealing ring so that a predetermined operating differential pressure is generated across the gap in the operating state of the seal, i.e. upon rotation of the shaft at its operating speed, and the stator sealing ring can be biased by a spring against the force of the sealing pressure while a rubber or plastic O-ring can seal between the stator sealing ring and a cylindrical portion of the sealing housing which extends coaxial with and parallel to the shaft.

With such a sealing arrangement it is important to distinguish between the functional annualar gap, i.e. the gap between the cylindrical portion and the stator ring, and the mounting ring gap or tolerance, i.e. the gap or clearance which is provided to enable, for example, the stator ring to be mounted.

The functional gap is developed out of the mounting ring gap by a kind of displacement in the mounted condition by the effect of the sealing operating pressure differential.

It will be understood that there are various constructions of prior art systems which utilize this approach to seal around a shaft. Some of these systems date back to 1925 and a variety of materials having the requisite hardness for such sealing systems is described, for example, in VDI Zeitschrift 102 (1960) No. 18, pages 728 to 732.

In one sealing arrangement of the aforedescribed type (see European Patent Publication EP 0013678) the recesses of the sealing rings which generate the pressure gradient are spiral grooves which extend from a peripheral edge of the respective sealing ring. In this case, only the rotor sealing ring is composed of a material of high thermal conductivity, modulus of elasticity and hardness.

The stator sealing ring is composed of a material of relatively low modulus of elasticity and minimal hardness, for example, of carbon, whose thermal conductivity is not significant.

Because of the relatively low modulus of elasticity and thermal conductivity of the thermal stator ring, this prior art sealing arrangement can give rise to a torsional deformation (twist) of the sealing assembly at least partially as a consequence of the operating temperature and this, in turn, can result in a cocking of one of the rings.

The temperature gradient in the axial direction can in such cases be 25° C. or more. The torsional deformation of the stator sealing ring can detrimentally affect the seal formed during operation, can result in contact at inappropriate times between the sealing rings and can be disadvantageous for a variety of other reasons.

It has been proposed to overcome the problem by counteracting the torsional deformation moment, twist or torque by a moment or torque generated by an appropriate pressure distribution in the sealing gap so that the two torques are effective in opposite senses. For this purpose, the recesses are formed as spiral grooves which are designed to have a pumping effect at least for the spiral grooves formed in the rotor sealing ring and these grooves can extend inwardly toward the opposite inner periphery from one of the inner peripheries of the annular sealing surface. These grooves can end in a dam or rib so that the groove is not throughgoing from one peripheral edge to the other. As a function of the spiral groove depth and the intergroove rib width as well as a function of the equilibrium between the various parameter, it is possible to create the torque balance desired wherein the torsion effect is counterbalanced by the torque or moment generated by the gas pressure.

Even when these conditions are scrupulously observed, the desired effect cannot always be achieved or the effect which is obtained can be unsatisfactory. For example, the described equilibrium cannot be obtained under all operating conditions. In practice, the plane parallelity of the confronting sealing surface can be restored only to a maximum of about 70%.

The problem appears to be that conventional systems are not adequately able to take into consideration significant tribologic characteristics of the seal, like inertia, tiffness, frictional moment etc. As a consequence, upon resetting of the torsional deformation or twist, the deformation may not be sufficiently compensated.

The most readily observable result of these problems with conventional systems is a detrimental leakage rate which tends to increase with increasing speed of the shaft and thus with increasing speeds of the rotor sealing ring because of the pumping effect of the spiral grooves. This leakage phenomenon tends to increase even more as a result of the incomplete restoration of the sealing ring following a torsional deformation as described.

The fact that, in the prior art system, a temperature-dependent and differential-pressure-dependent torsional deformation of the stator sealing ring is permissible and is in part caused by the arrangement of the polar moment of inertia of the stator sealing ring, so that the described pressure distribution in the gap is necessary to reset it, has a further drawback which is detrimental to the effective operation of the seal. The described twist requires, in accordance with the laws of mechanics, that the mounting ring gap be significantly greater than the functional annular gap as is formed when the stator sealing ring has undergone twisting and without consideration of the resetting of the twist resulting from the pressure distribution in the pressurized gas gap. The dimensions of the mounting ring gap (mounting tolerance) and the ratio of the mounting ring gap to the functional gap under the various operating conditions cannot be related to the resetting in most instances because the temperature dependent deformation and the resetting which is dependent upon the operating state of the sealing arrangement do not occur simultaneously and both must occur under conditions that a contact of the sealing surface of the rotor and stator sealing rings does not occur.

In practice, under all conventional diameter relationships of the sealing arrangement in the conventional system, the width of the mounting ring gap is in the range of 0.4 to 0.5 mm and usually, therefore, is in excess of 0.4 mm.

In practice that has meant that the O-ring of the conventional device should have a corresponding hardness, for example, a Shore A hardness of 90 or more in accordance with German Industrial Standards DIN 53505.

In spite of this adaptation of the O-ring to the conditions described, it has been found that operating pressure differentials above 80 bar or reaching a maximum of 100 bar cannot be provided in a practical sense if the sealing assembly is to be used for the conventional operating life of several thousand hours.

On the other hand, the industrial need is increasing for sealing arrangements which require much higher operating pressure differentials, i.e. pressure differentials which can be well above 100 bar. There is another aspect of the operation of a conventional sealing of the type described which should be mentioned. If one applies an O-ring of high hardness ahead of the annular gap between the stator sealing ring and the cylindrical portion of the sealing housing, the latter is subjected to nonuniform stresses resulting from the fact that the relative rotation of the shaft with the rotor sealing ring and the surrounding housing is neither perfectly round nor perfectly coaxial with the stator sealing ring and the associated housing parts. Accordingly, vibrations can result as induced by the stator sealing ring. These vibrations apply to the O-ring.

The functional annular gap must be defined with a certain amount of play to accommodate these vibrations without detriment to the sealing effectiveness. When the O-ring is composed of a very hard material it is not generally able to follow the induced movements of the stator sealing ring and thus maybe unduly stressed and can become damaged. It may, if hard enough, limit the play required as described above and resulting in a detriment to the sealing effectiveness. In particular, this can lead to detrimental contact between the sealing end faces of the rotor sealing ring and the stator sealing ring.

OBJECTS OF THE INVENTION

It is the principal object of the present invention to produce a pressurized gas contactless sealing arrangement of the general type described which will extend the principles set forth in our earlier applications as identified above.

Another object of this invention is to provide a pressurized gas seal having a rotor sealing ring and a stator sealing ring and adapted to seal around a shaft which can avoid drawbacks of earlier systems and particularly the earlier systems described above.

Yet another object of this invention is to provide a contactless seal arrangement, hereinafter referred to as a gas seal, a contactless seal or a pressurized gas seal, which can be used for operating differential pressures significantly higher than those of earlier seals of this type, e.g. for operating pressure differences up to 300 or even to 500 bar, with more reliable and greater sealing effectiveness and longer useful or operating life.

SUMMARY OF THE INVENTION

This object is achieved, in accordance with the invention, by providing the stator sealing ring so that it also is developed of a hard sealing material of high thermal conductivity, high modulus of elasticity and high hardness and, indeed, such that the stator sealing ring and the rotor sealing ring are both composed of a hard sealing material of a thermal conductivity in excess of 70 W/mK (=kJ/mhK), a modulus of elasticity in excess of 250,000 N/mm$^2$ with corresponding hardness, a pore volume of less than 1% and a surface roughness of less than 0.3 $\mu$m (Ra), preferably less than 0.03 $\mu$m (Ra).

According to another essential feature of the invention, the polar or geometric moment of inertia of the stator sealing ring is sufficiently large that the gap width of the functional annular gap between the shaft-side cylindrical part of the sealing ring in the operational state and under the operational differential pressure corresponds to the structurally predetermined gap width of the mounting ring gap between the cylindrical part of the sealing housing and the stator sealing ring in all operational states and is less than 0.4 mm and preferably less than 0.3 mm.

The third essential feature of the present invention is that the sealing O-ring additionally serve as a compensation or centering ring and, for this purpose, has a material hardness which is greater than the extrusion threshold of this material through the gap and for the given gap width at the predetermined operating pressure differential and is less than a hardness of 90 Shore A according to German Industrial Standard DIN 53 505. Preferably the hardness of the O-ring is less than 80 Shore A under this standard.

In other words according to the invention the parts are so related and dimensioned that the orientations of the sealing end faces of the rotor sealing ring and the stator sealing ring do not change in operation and preferably are always parallel.

With a sealing arrangement in accordance with the invention, surprisingly, it is not necessary to lay out the grooves or recesses in such manner as to provide a restoring force as has been the case heretofore. Indeed, the recesses or grooves on the juxtaposed sealing faces on the rotor and stator ring can be selected for optimal development of the gas pressure blocking the seal. Preferably, the recesses can be formed as gas-displacement spiral grooves. In this connection, however, it is possible to form the recesses or grooves as pressure generating recesses with damming edges.

The reference to spiral grooves, of course, is intended to define grooves of such shape that they provide a displacement of gas in a predetermined direction in the gas dynamic sense.

This gas displacement can be used to counteract the leakage flow which can give rise to the leakage rate of the fluid sealed by the arrangement and hitherto considered to be unavoidable. Recesses with a damming edge, by contrast are elements in the gas dynamic sense which prevent or do not allow a definitive displacement of the gas, but rather serve to block such displacement and create static gas pressure conditions.

In both cases, however, the invention allows optimization of the sealing effect and this optimization is not adversely effected by the need to generate a restoring force or the need to establish equilibrium continuous between a restoring force and a torsional force upon a sealing ring.

In a preferred embodiment of the invention, stator sealing ring has a polar moment of inertia which limits temperature dependent torsional deformation of its sealing surface.

Such a polar moment of inertia can be calculated readily using methods which have become conventional in modern computer analysis of mechanical systems.

A value Ra is the mean roughness as determined by German Industrial Standard DIN 4768.

In a preferred feature of the invention the planarity of the sealing surface at room temperature and with a temperature gradient of zero should be 0.4 micrometers per 100 mm along the diameter.

In spite of the fact that the aforedescribed values of the thermal conductivity, modulus of elasticity and hardness are observed, the sealing rings can be composed of a variety of materials.

The sealing rings can be composed, for example, of a material selected from the group which consists of tungsten carbide, silicon carbide, silicon/silicon carbide composites, titanium carbide, $Si_3N_4$, $Al_2O_3$ and $ZrO_2$ or combinations, pairings and mixtures thereof.

The sealing rings can be formed by sintering or combinations of pressing and sintering allowing the pore volume of the sealing rings to be established.

In accordance with a feature of the invention, both sealing rings can be composed of the same material. However, it is also possible to make the stator sealing ring on the one hand and the rotor sealing ring on the other from pairs of different materials within the compositions defined above.

Best results are achieved, in accordance with the invention by fabricating the sealing rings so that their pore volumes are less than 0.5%.

The stator sealing ring preferably can have an annular cross section whose ring height in the axial direction is at least twice the radial ring breadth.

With respect to the arrangement of the recesses, a preferred embodiment of the invention has the recesses or grooves beginning at a periphery of the respective sealing end face and terminating at a boundary between the annular portion of the end face further with the grooves and a groove or recess free portion of the end face.

The recesses can start, in addition, from the inner diameter or circumference or from the outer diameter or circumference of the sealing end face and can end at a recess-free dam.

In this latter case, the spiral grooves can be so arranged that the pumping effects of the two grooves are counter to one another.

Especially for the embodiment in which damming edges are provided, it has been found advantageous to have the recesses terminate at a meander-shaped dam. According to the invention, moreover, the sealing end faces can be formed with emergency contacting layers in the form of a coating or layer of several micrometers of graphite, polytetrafluoroethlene or a like, low-friction, low-wear material. The protective substance, reducing deterioration of the sealing surface upon emergency contact of one surface with the other, can also be carbon embedded in the material of the sealing surface.

In accordance with the invention, the embodiments wherein the recesses are formed with damming edges have proved to be of special significance. In a preferred embodiment in accordance with this aspect of the invention, the damming edges of the recesses run in radial direction. Alternatively, the damming edges can be formed as circular arc segments as seen in an elevational view and this configuration has been found to be most applicable where the recesses themselves are generally circular.

According to another feature of this aspect of the invention, the damming edges can be lateral edges of recesses which are triangular in their elevational view and which converge toward one of the peripheries at which the recesses open, the triangle vertex being truncated at the periphery.

The recesses according to the invention should be symmetrical with respect to a line of symmetry extending in the radial direction. If this symmetry requirement is fulfilled, the gas sealing arrangement of the invention is independent of the direction of rotation of the shaft. If this symmetry requirement is not fulfilled or is undesirable, the recesses can have asymmetrical damming edges which are, for example, L-shaped. The depths of the recesses can lie in the micrometer range.

The invention achieves all of the objects set forth above and thus has the advantage that a gas seal arrangement exploits a combination of tribiological characteristics and has its recesses so arranged that the generation of a moment or torque for resetting the torsional deformations need not be generated by the pressure distribution in the sealing gap.

While the recesses can be spiral grooves capable of a defined pumping effect, as a general matter the use of recesses with such a definitive pumping effect can be eliminated and, of course, this is the case with embodiments having damming edges which preclude a pumping action. The elimination of the pumping effect substantially reduces the leakage rate.

If one compares the sealing arrangement of the invention prior art gas seals, it is found, quite surprisingly, that the leakage rate can be reduced by at least 50%. Associated with this is the possibility of operating the sealing rings at substantially higher temperatures because immediately after startup there is a low temperature gradient so that torsional deformations resulting from high temperature gradients practically do not arise.

The temperature gradient in the axial direction lies below 1° C. as compared to temperature gradients of 20° C. more with the prior art systems. These advantages apply to all conventional sizes of the gas sealing arrangement, i.e. shaft diameters of, for example, 50 to 250 mm and shaft peripheral speeds of up to 150 meters per second.

The polar moment of inertia of the stator sealing ring restricts torsional deformation thereof. The low pore volume and the low surface roughness in the regions of the end faces of the sealing rings in which the recesses are not provided, appear to contribute substantially to a reduction in the leakage rate.

Surprisingly, moreover, there are no startup and shutdown problems. The low incidence of startup and shutdown problems appears to be a result of the fact that the mounting tolerance is equal to the gap width of the functioning annular gap between the stator sealing ring and the cylindrical portion of the housing on which the stator sealing ring is mounted in practically all operating conditions and further that the gap width of the functional annular gap is substantially constant under all of these conditions.

Moreover, the functional gap width is so minimal that it can be bridged by an O-ring of significantly reduced material hardness without raising a danger of extrusion of the O-ring by the operating pressure differential. The sealing arrangement of the invention, therefore, can be used for especially high pressure seals and operates with high reliability for an especially long useful life.

The assembly can comprise:
   a sealing housing surrounding an axis;
   a shaft extending along the axis and surrounded by the housing, the shaft being rotatable relative to the housing, the sealing housing being formed with a cylindrical portion at a shaft side of the housing coaxially surrounding the shaft;
   a stator sealing ring extending around and axially overlapping the cylindrical portion, mounted on the housing and having an end face defining one of a pair of sealing-gap-defining faces and composed of a hard sealing material of high thermal conductivity, high hardness and high modulus of elasticity, the stator sealing ring defining with the cylindrical portion and around the cylindrical portion a functional annular gap and the stator sealing ring being movable axially on the cylindrical portion;
   an O-ring composed of rubber or plastic bridging between the stator sealing ring and the cylindrical portion and axially sealing the functional annular gap;
   a rotor sealing ring mounted on the shaft, rotatable entrained by the shaft and formed with an end face juxtaposed with the end face of the stator sealing ring defining another of the pair of sealing-gap-defining faces and composed of a hard sealing material of high thermal conductivity, high hardness and high modulus of elasticity, the end faces defining an annular sealing gap between them, relative rotation of the end faces generating a gas pressure in the sealing gap blocking passage of fluid past the assembly; and
   spring means including at least one spring braced between the housing and the stator sealing ring and applying to the stator sealing ring a predetermined axial force acting in a direction opposite the action of the gas pressure in the sealing gap on the stator sealing ring,
   the stator sealing ring having a polar moment of inertia sufficient to maintain a gap width of the functional annular gap substantially equal to a mounting tolerance of the stator sealing ring on the cylindrical portion in all operating conditions of the assembly and under an operating pressure differential across the assembly,
   the end face of the stator sealing ring and the end face of the rotor sealing ring having the same orientations with respect to one another in all operating conditions of the assembly,
   the O-ring forming a position-compensating centering ring for the stator sealing ring on the cylindrical portion having a material hardness which is greater than an extrusion limit of material hardness for extrusion of the O-ring into the functional annular gap at the gap width and under the operating pressure differential,
   the stator sealing ring and the rotor sealing ring being composed of materials having a thermal conductivity in excess of 70 W/mK (=kJ/mhK), a modulus of elasticity in excess of 250,000 N/mm$^2$, a pore volume of less than 1% and a surface roughness less than 0.3 $\mu$m Ra, preferably less than 0.03 $\mu$m (Ra),
   the tolerance and the gap width of the functional annular gap being less than 0.4 mm, and
   the O-ring having a material hardness less than 90 Shore A (DIN 53 505).

Within the invention is, therefore, a gas-pressure contactless shaft-sealing assembly, comprising:
   a sealing housing surrounding an axis; a shaft extending along the axis and surrounded by the housing, the shaft being rotatable relative to the housing, said sealing housing being formed with a cylindrical portion at a shaft side of said housing coaxially surrounding said shaft;
   a stator sealing ring extending around and axially overlapping said cylindrical portion, mounted on said housing and having an end face defining one of a pair of sealing-gap-defining faces and composed of a hard sealing material of high thermal conductivity, high hardness and high modulus of elasticity, said stator sealing ring defining with said cylindrical portion and around said cylindrical portion a functional annular gap and said stator sealing ring being movable axially on said cylindrical portion;
   an O-ring composed of a material selected from the group which consists of rubber or and plastic bridging between said stator sealing ring and said cylindrical portion and axially sealing said functional annular gap;
   a rotor sealing ring mounted on said shaft, rotatably entrained by said shaft and formed with an end face juxtaposed with said end face of said stator sealing ring defining another of said pair of sealing-gap-defining faces and composed of a hard sealing material of high thermal conductivity, high hardness and high modulus of elasticity, said end faces defining an annular sealing gap between them generating upon relative rotation of said end faces a gas pressure in said sealing gap blocking passage of fluid past said assembly, at least one the faces being provided with an array of equispaced triangular recesses adjacent an outer periphery of one of the end faces and symmetrical with reference to respective radii from the axis and having vertices laying along the outer periphery; and
   spring means including at least one spring braced between said housing and said stator sealing ring and applying to said stator sealing ring a predetermined axial force acting in a direction opposite the action of said gas pressure in said sealing gap on said stator sealing ring,
   said stator sealing ring and said rotor sealing ring being composed of materials having a thermal conductivity in excess of 70 W/mK (=kJ/mhK), a modulus of elasticity in excess of 250,000 N/mm$^2$, a pore volume of less than 1% and a surface roughness less than 0.3 $\mu$m Ra, said stator sealing ring having a geometric moment of inertia sufficient to maintain a gap width of said functional annular gap substantially equal to a gap width established upon assembly of said stator sealing ring on said cylindrical portion in all operating conditions of said assembly and less than 0.4 mm, and said O-ring forming a position-compensating centering ring for said stator sealing ring on said cylindrical portion and having a material hardness less than 90 Shore A and greater than an extrusion limit of material hardness for extrusion of said O-ring into said functional annular gap at said gap width and 70 Shore A and under an operating pressure differential of substantially 300 to 500 bar.

Alternatively the invention is a gas-pressure contactless shaft-sealing assembly, comprising:

a sealing housing surrounding an axis;

a shaft extending along said axis and surrounded by said housing, said shaft being rotatable relative to said housing, said sealing housing being formed with a cylindrical portion at a shaft side of said housing coaxially surrounding said shaft;

a stator sealing ring extending around and axially overlapping said cylindrical portion, mounted on said housing and having an end face defining one of a pair of sealing-gap-defining faces and composed of a hard sealing material of high thermal conductivity, high hardness and high modulus of elasticity, said stator sealing ring defining with said cylindrical portion and around said cylindrical portion a functional annular gap and said stator sealing ring being movable axially on said cylindrical portion;

an O-ring composed of a material selected from the group which consists of rubber or and plastic bridging between said stator sealing ring and said cylindrical portion and axially sealing said functional annular gap;

a rotor sealing ring mounted on said shaft, rotatably entrained by said shaft and formed with an end face juxtaposed with said end face of said stator sealing ring defining another of said pair of sealing-gap-defining faces and composed of a hard sealing material of high thermal conductivity, high hardness and high modulus of elasticity, said end faces defining an annular sealing gap between them generating upon relative rotation of said end faces a gas pressure in said sealing gap blocking passage of fluid past said assembly, at least one the end faces being formed with an array of equispaced circular recesses having circumferences osculating an outer periphery of one of the faces and symmetrical with reference to respective radii from the axis; and spring means including at least one spring braced between said housing and said stator sealing ring and applying to said stator sealing ring a predetermined axial force acting in a direction opposite the action of said gas pressure in said sealing gap on said stator sealing ring, said stator sealing ring and said rotor sealing ring being composed of materials having a thermal conductivity in excess of 70 W/mK (=kJ/mhK), a modulus of elasticity in excess of 250,000 N/mm$^2$, a pore volume of less than 1% and a surface roughness less than 0.3 $\mu$m Ra, said stator sealing ring having a geometric moment of inertia sufficient to maintain a gap width of said functional annular gap substantially equal to a gap width established upon assembly of said stator sealing ring on said cylindrical portion in all operating conditions of said assembly and less than 0.4 mm, and said O-ring forming a position-compensating centering ring for said stator sealing ring on said cylindrical portion and having a material hardness less than 90 Shore A and greater than an extrusion limit of material hardness for extrusion of said O-ring into said functional annular gap at the gap width and 70 Shore A and under an operating pressure differential of substantially 300 to 500 bar.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

The sealing arrangement illustrated in FIGS. 1 to 7 is provided for a shaft 1 and comprises a sealing housing 2 in which a stator sealing ring 3 is mounted. As can be seen from FIG. 1, the sealing housing 2, in turn, is received in a housing 20 with respect to which the shaft 1 can be journaled, e.g. of a compressor, pump or other device which must have a high pressure seal between regions having a high gas pressure differential there across. An O-ring 21 is provided in a groove 22 of the housing 2 and sealingly engages a surface of the housing 20. The housing 20 is provided with splines 23, for example, which are engaged in the grooves (not shown) of the housing 1 so that the latter cannot rotate relative to the housing 20. The housing 2 is also axially braced against a shoulder 24 of the housing 20.

Figure 1:
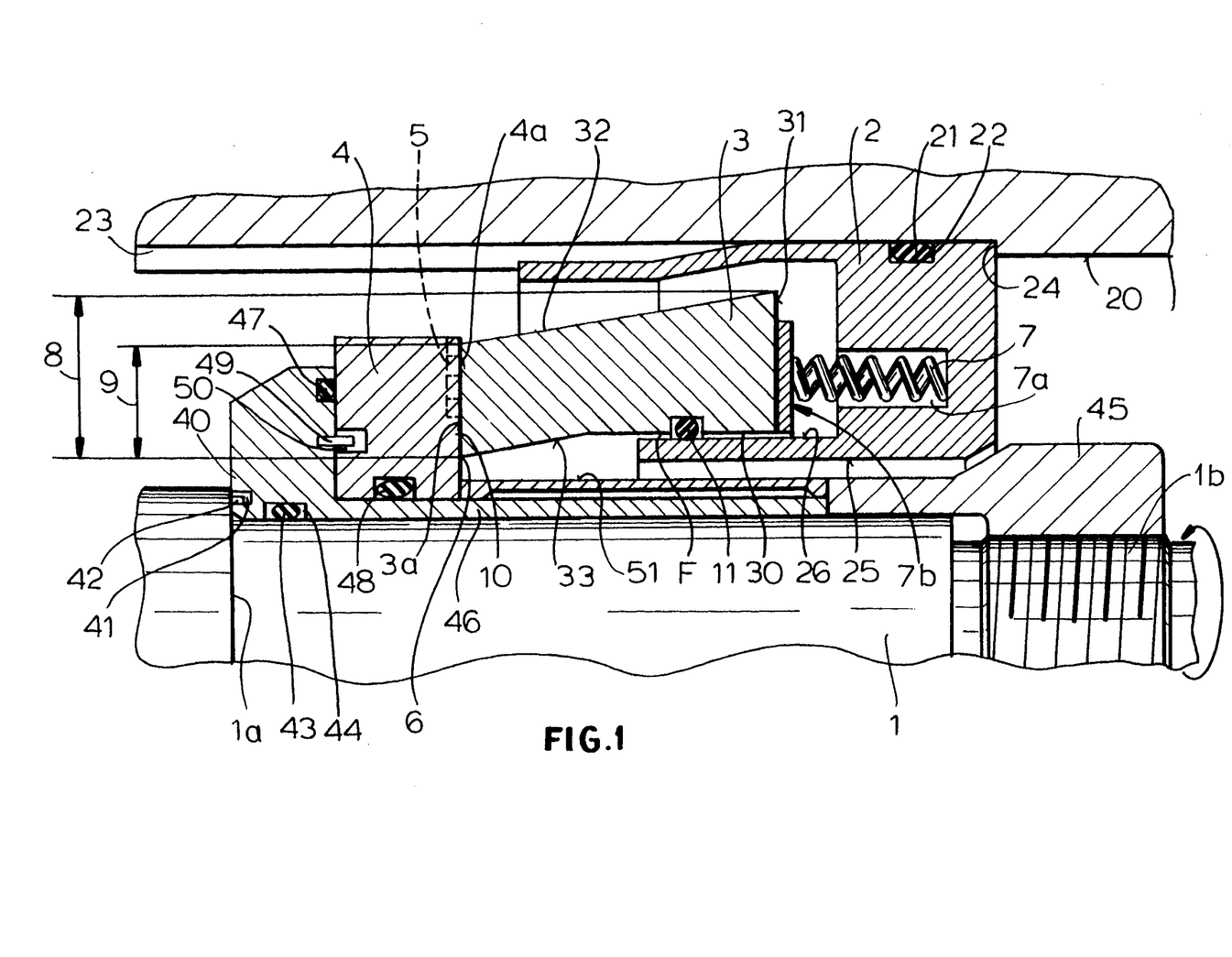
FIG. 1 is an axial section through a sealing assembly of the present invention in the mounted state.

The housing 2 also has a cylindrical portion 25 which extends axially close to the shaft 1 and closely surrounds the latter.

A stator sealing ring 3 is mounted on the housing 2 and has a cylindrical surface 30 juxtaposed with the cylindrical surface 26 of the housing to define a functional annular gap F whose gap width is substantially equal to the mounting clearance of the stator sealing ring 3 on the cylindrical portion 25.

The stator sealing ring 3 has a sealing end face 3a, a rear surface 31 and an outer conical flank 32 extending between the rear end face 31 and the sealing end face 3a. A further conical surface 33 of the same conicity as the surface 32 extends between the end face 3a and the cylindrical surface 30.

The sealing end face 3a of the stator sealing ring is juxtaposed with a sealing end face 4a of a rotor sealing ring 4. The rotor sealing ring 4 is axially entrained with the shaft 1 via a sleeve 40 which has an axially extending recess 41 in which a pin 42 from a shoulder 1a of the shaft engages to rotationally lock the sleeve 40 to the shaft. An O-ring 43 in a groove 44 of the sleeve 40 seals this sleeve against the shaft. The sleeve 40 is clamped against the shoulder 1a by a clamping nut 45 which is threadedly engaged on a threaded portion 1b of the shaft 1. A cylindrical portion 46 of the sleeve 40 receives the sealing ring 4 which is sealed against the sleeve via O-rings 47 and 48. A pin 49 from the sleeve 40 engages in a hole 50 to insure that the rotor sealing ring 4 will rotate with the sleeve 40 and hence with the shaft. A spaces sleeve 51 is clamped between the ring 4 and the nut 45 and holds the ring 4 against the O-ring 47.

The rotor sealing ring 4 is formed on its end face 4a with recesses 5 which open along the periphery so as to develop a gas pressure in a sealing gap 6 between the end faces 3a and 3b. This sealing gap has not been illustrated in FIG. 1 because of the square of the drawing but is readily visible in FIG. 8.

A predetermined force is applied to the stator sealing ring 3 by a spring means constituted by a plurality of angularly equispaced coil springs 7 received in respective pockets 7a of the housing 2 and braced against a pressure ring 7b bearing upon the end face 31 of the stator sealing ring 3. The springs 7 thus press the stator sealing ring axially in the direction of the rotor sealing ring.

The stator sealing ring 3 has a ring height 8 which is greater than the radial breath 9 of the sealing end face 3a and is movably mounted, i.e. can move radially within the mounting tolerance limit relative to the housing 2 and can be displaced axially by the spaces 7 or the pressure in the gap.

Both sealing rings 3 and 4 are composed of a material of high thermal conductivity, high modulus of elasticity, low pore volume and low surface roughness. Specifically, the thermal conductivity should exceed 70 W/mK, the modulus of elasticity should exceed 250,000 N/mm$^2$ with corresponding hardness, the pore volume should be less than 1% and the surface roughness should be below 0.3 micrometer Ra, preferably below 0.03 micrometer Ra.

The stator sealing ring 3 has an axial polar moment of inertia which limits temperature dependent torsional deformations of its sealing end face 3a. This can be seen from FIG. 1.

Figure 2:
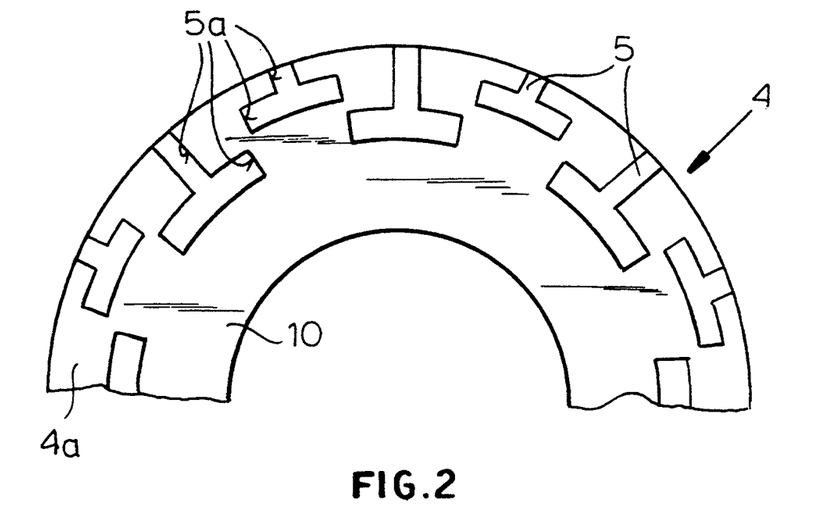
FIG. 2 is an elevational view of the rotor sealing ring of FIG. 1.
Figure 3:
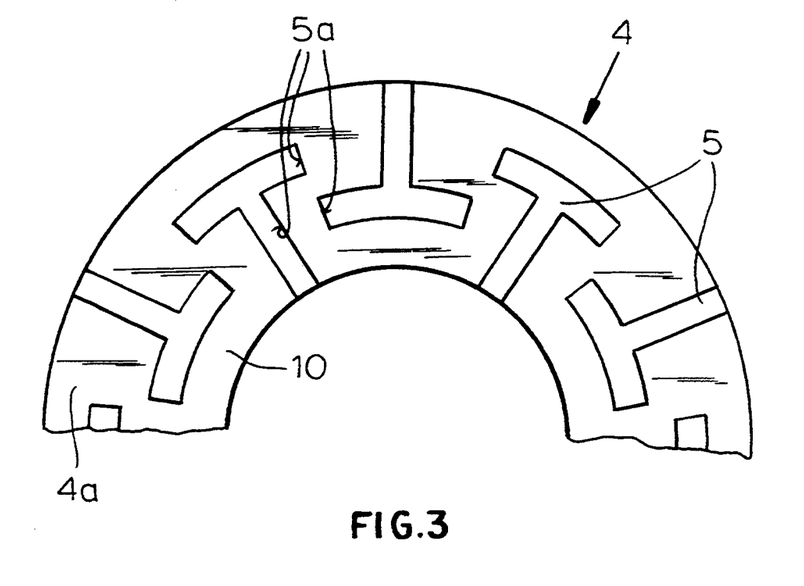
FIG. 3 is a view similar to FIG. 1 illustrating an embodiment of the invention in which the T-shaped recesses extend inwardly on the rotor sealing ring from both of the peripheral edges of the rotor sealing ring.
Figure 4:
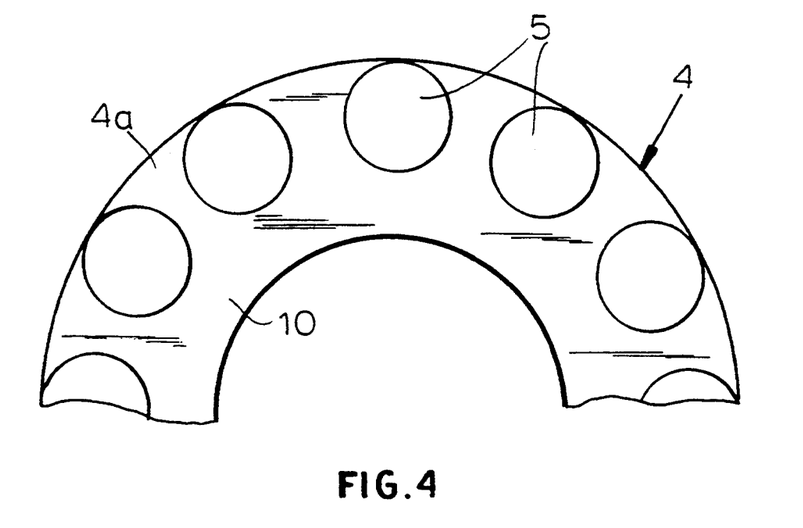
FIG. 4 is a view similar to FIG. 2 of an embodiment in which the damming edges are circular arcs.
Figure 5:
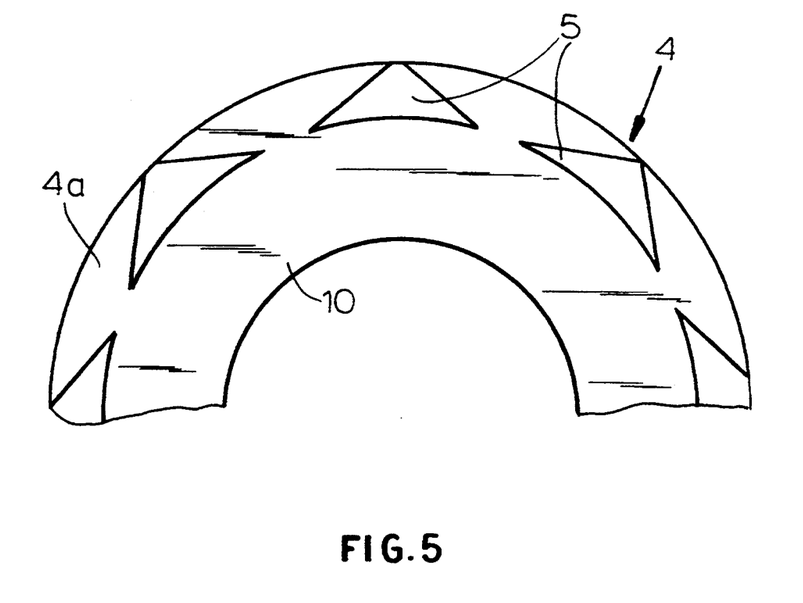
FIG. 5 is a view similar to FIG. 2 wherein the damming edges are inclined flanks of generally triangular recesses which are truncated at one vertex.

The recesses 5 can have configurations as shown in FIGS. 2 through 7. With the configurations of FIGS. 2 and 3, the recesses are shown to have been provided without concern for the formation of a restoring torque which would have to act counter to a torsional deformation and which would result from the pressure generated in the gap 6; with these configurations the leakage rate is minimized. The damming edges 5a counteract any pumping effect. In FIGS. 2 and 3, the recesses are generally T-shaped and have radial damming edges 5a. In FIG. 4 the recesses 5 are generally circular. In FIG. 5 the recesses have triangular configurations with uniformly truncated vertices. The sealing rings are composed of tungsten carbide, silicon carbide, silicon/silicon carbide composites, titanium carbide or combinations or mixtures thereof preferably of the same materials.

From FIGS. 2, 4 and 5, it is apparent that the recesses 4 and 5 can open along the outer peripheral edge of the sealing end face 4a and can terminate at a dam 10 of the end face 4a which is formed by a portion of this end face free from recesses.

From FIG. 3 it can be seen that the recesses 5 can open at the inner circumference as well as at the outer circumference or periphery and that the recesses, regardless of which periphery that extend inwardly from, terminate at a central recess, free dam 10. In FIG. 3 the dam 10 extends in a meander pattern.

The sealing end faces 3a and 4a can be provided with emergency contacting coatings of the small thicknesses of graphite, polytetrafluoroethlene or the like. These coatings are shown at 3b and 4b in FIG. 13 and have not been illustrated in other FIGS. because of the scale of the illustration.

Figure 6:
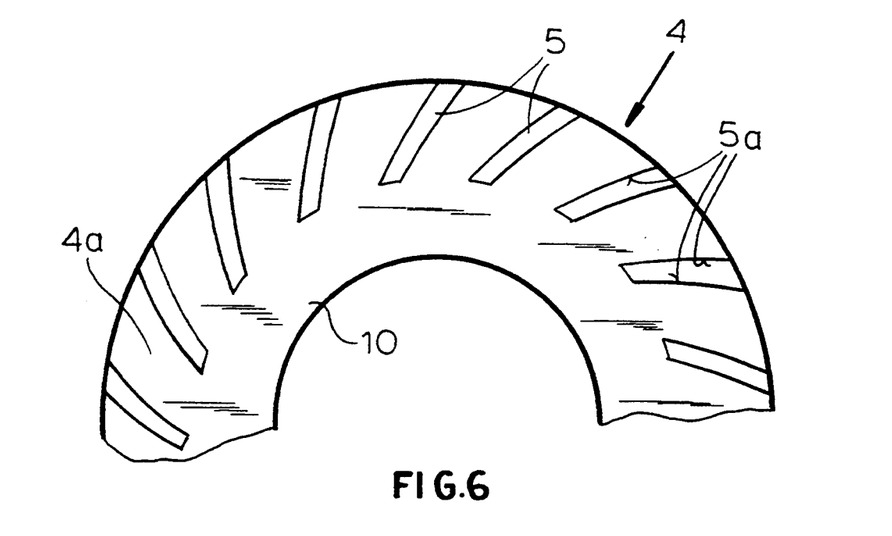
FIG. 6 is a view similar to FIG. 2 wherein the recesses have a spiral groove configuration.
Figure 7:
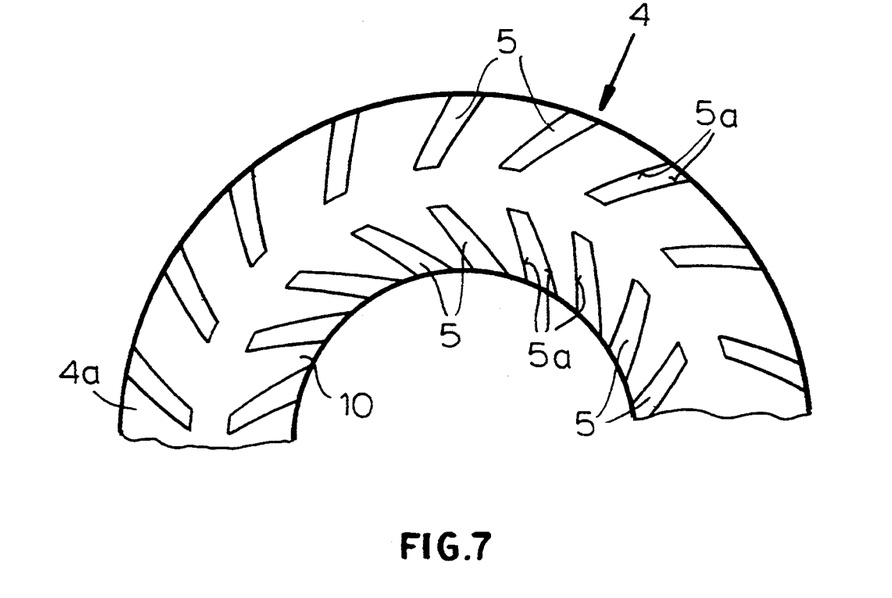
FIG. 7 is a view similar to FIG. 6 illustrating another embodiment.

With the embodiment of FIGS. 6 and 7, the recesses 5 are spiral grooves. In this case, a pumping effect is counteracted by having the grooves terminate at dams in the manner described.

Figure 8:
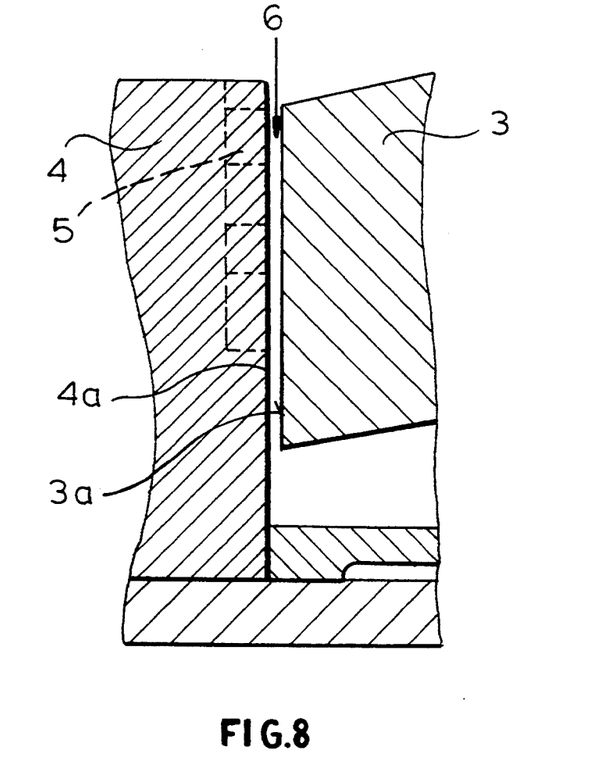
FIG. 8 is an enlarged cross sectional detailed view of FIG. 1 in the region of the sealing end faces.

FIG. 8 shows the gap region 6 to an enlarged scale. It will be apparent from this FIG. that the two sealing end faces 3a and 4a are, with great precision, planar and parallel to one another. In the operating condition of the sealing arrangement they define the sealing gap 6 which can be considered to be a fast or rigid gap and this gap is maintained by the gas pressure within the gap acting counter to the springs 7.

From FIG. 1 it will be apparent that the functional annular gap F coincides substantially with the mounting ring gap or clearance required for allowing the stator sealing ring 25 3 to be mounted on the cylindrical portion 25.

In operation, the width of this gap is held at a constant value, preferably of 0.4 mm or less and, still more advantageously, at 0.3 mm or less. Under all operating conditions, the stator sealing ring 3 remains twist free.

Figure 9:
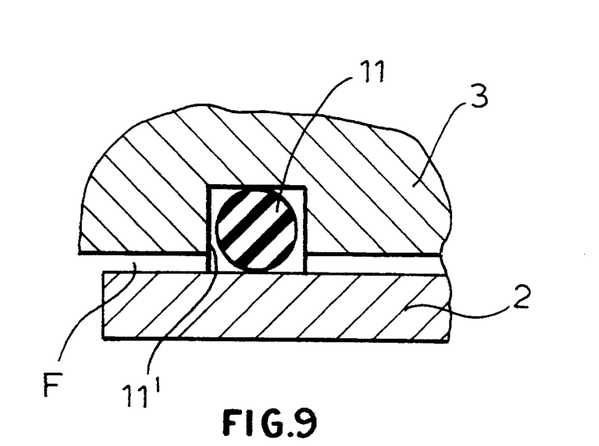
FIG. 9 is a detailed section in the region of the functional gap.

The enlargement of FIG. 9 shows that an O-ring 11 in a groove 11' of the stator sealing ring 3 bridges the functional ring gap F and that the relative sizes of the O-ring and the gap width are such that even with very high pressure differentials across the O-ring, the O-ring cannot be forced into or extruded through the functional gap F.

The O-ring 11 can, because of the small width of the functional annular gap 11, have a relatively low material hardness, i.e. a hardness of less than Shore A 90 and preferably less than a Shore A hardness of 80 according to German Industrial Standard DIN 53 505.

As a consequence, the O-ring can serve as a centering element for the stator sealing ring 3 in the radial direction because it can have an appropriate elasticity for this purpose.

The spring 7 can be replaced by a closed bellows type spring which can function as a centering element.

In the embodiments of FIGS. 1 to 7, the sealing ring end face 4a of the rotor sealing ring 4 and the sealing ring end face 3a of the stator sealing ring 3 are planar with a high degree of precision and parallel to one another.

Figure 11:
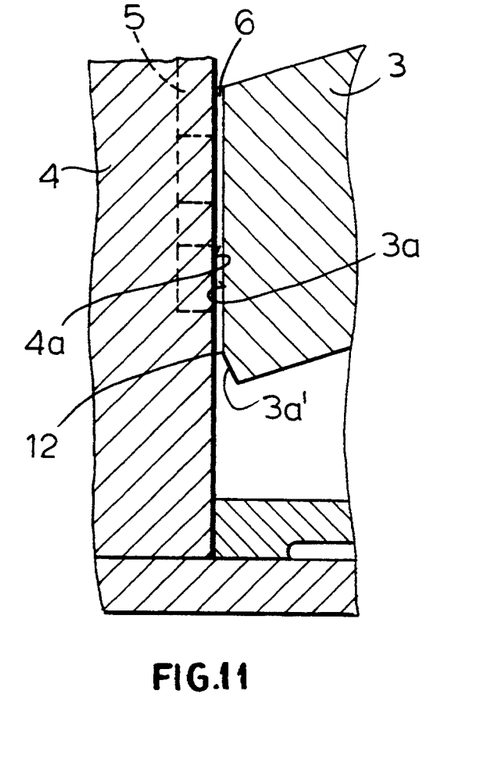
FIG. 11 is a view similar to FIG. 8 showing another embodiment of the invention.

In the embodiment of FIG. 11, however, which corresponds to FIG. 8 but has a different configuration of the end face of the stator sealing ring, the end face is here shown to comprise two annular surfaces 3a and 3a' which adjoin one another at an edge 12 in a peak configuration. These annular surfaces are thus inclined to one another.

Figure 12:
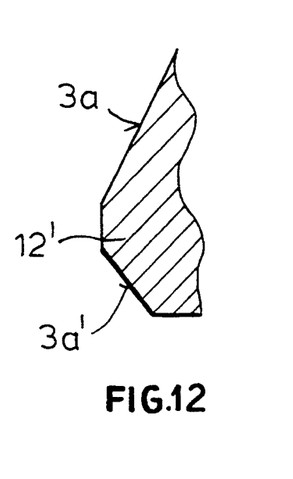
FIG. 12 is a view of the end faces of the stator sealing ring of the embodiment of FIG. 11, illustrating a modification thereof.

As can be seen from FIG. 12, instead of defining an edge, the peak region between the surfaces 3a and 3a' can define a step 12'.

The invention utilizes configuration, materials and construction of the stator sealing ring and the rotor sealing ring such that no detrimental temperature dependent twist or other operation condition dependent deformations of the stator sealing ring will occur.

That permits very small mounting tolerances to be used and, in particular, a mounting tolerance which corresponds to the functional annular gap F, the latter being small enough to operate with O-rings 11 which are not destroyed, damaged or extruded into the functional annular gap by pressure differences of 300 to 500 bar or more. As a result, the sealing arrangement of the invention is suitable for high and very high pressures, has a minimum leakage rate and an extremely high useful life.

Figure 10:
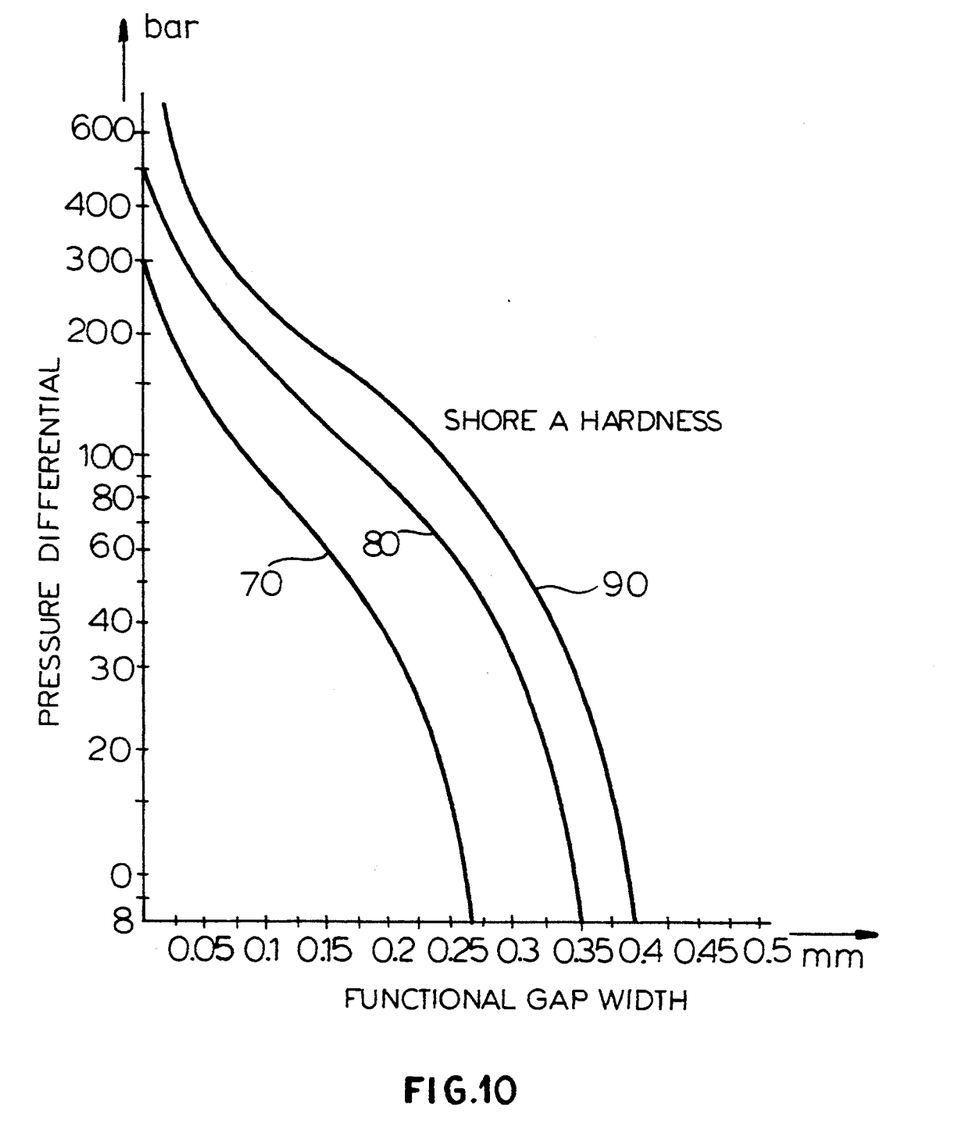
FIG. 10 is a graph illustrating a feature of the invention.

FIG. 10 is a diagram in which the characteristic of an O-ring disposed adjacent a gap and subjected to a high pressure is plotted.

Along the ordinate, we have plotted the operating pressure, i.e. the pressure differential across the O-ring tending to drive it into the gap, in bars. The abscissa axis has the radial gap width plotted therealong.

The curves 70, 80 and 90 in this graph are labelled with the Shore A hardness of the O-ring. All other conditions, namely, the size, close face and diameter of the O-rings are the same.

The curves show, therefore, for each Shore A hardness of the O-ring the operating pressure which will cause the O-ring to extrude into the gap of the corresponding width.

It has been found to be advantageous, as noted, to operate with a Shore A hardness of 80 or less since greater hardness does not provide the requisite resiliency for centering of the stator sealing ring.

Figure 13:
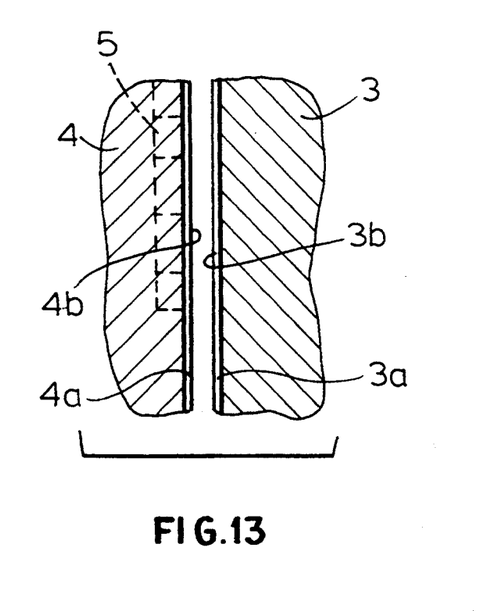
FIG. 13 is a cross sectional view illustrating another feature of the invention.

In FIG. 13, as noted, the end faces of the sealing rings 3 and 4 are shown to be provided with the layers 3b and 4b of the friction reducing substances.

We claim:

1. A gas-pressure contactless shaft-sealing assembly, comprising:
    a sealing housing surrounding an axis;
    a shaft extending along said axis and surrounded by said housing, said shaft being rotatable relative to said housing, said sealing housing being formed with a cylindrical portion at a shaft side of said housing coaxially surrounding said shaft
    a stator sealing ring extending around and axially overlapping said cylindrical portion, mounted on said housing and having an end face defining one of a pair of sealing-gap-defining faces and composed of a hard sealing material of high thermal conductivity, high hardness and high modulus of elasticity, said stator sealing ring defining with said cylindrical portion and around said cylindrical portion a functional annular gap and said stator sealing ring being movable axially on said cylindrical portion;
    an O-ring composed of a material selected from the group which consists of rubber and plastic bridging between said stator sealing ring and said cylindrical portion and axially sealing said functional annular gap;
    a rotor sealing ring mounted on said shaft, rotatably entrained by said shaft and formed with an end face juxtaposed with said end face of said stator sealing ring defining another of said pair of sealing-gap-defining faces and composed of a hard sealing material of high thermal conductivity, high hardness and high modulus of elasticity, said end faces defining an annular sealing gap between them generating upon relative rotation of said end faces a gas pressure in said sealing gap blocking passage of fluid past said assembly, at least one of said end faces being formed with an array of equispaced circular recesses having circumferences osculating an outer periphery of said one of said end faces and symmetrical with reference to respective radii from said axis; and
    spring means including at least one spring braced between said housing and said stator sealing ring and applying to said stator sealing ring a predetermined axial force acting in a direction opposite the action of said gas pressure in said sealing gap on said stator sealing ring,
    said stator sealing ring and said rotor sealing ring being composed of materials having a thermal conductivity in excess of 70 W/mK (=kJ/mhK), a modulus of elasticity in excess of 250,000 N/mm$^2$, a pore volume of less than 1% and a surface roughness less than 0.3 μm Ra,
    said stator sealing ring having a geometric moment of inertia sufficient to maintain a gap width of said functional annular gap substantially equal to a gap width established upon assembly of said stator sealing ring on said cylindrical portion in all operating conditions of said assembly and less than 0.4 mm, and
    said O-ring forming a position-compensating centering ring for said stator sealing ring on said cylindrical portion and having a material hardness less than 90 Shore A and greater than an extrusion limit of material hardness for extrusion of said O-ring into said functional annular gap at said gap width and 70 Shore A and under an operating pressure differential of substantially 300 to 500 bar.

2. The assembly defined in claim 1 wherein said surface roughness is less than 0.03 μm Ra.

3. The assembly defined in claim 1 wherein said tolerance and said gap width of said functional annular gap is less than 0.3 mm.

4. The assembly defined in claim 1 wherein said O-ring has a material hardness less than 80 Shore A.

5. The assembly defined in claim 1 wherein said rotor sealing ring and said stator sealing ring are each composed of a material elected from the group which consists of tungsten carbide, silicon carbide, silicon/silicon carbide composite, titanium carbide and mixtures, pairings and combinations thereof.

6. The assembly defined in claim 1 wherein said end faces have a planarity of 0.4 micrometer/100 mm of diameter at room temperature and a zero temperature gradient thereacross.

7. The assembly defined in claim 1 wherein said stator sealing ring and said rotor sealing ring have pore volumes of less than 0.5%.

8. The assembly defined in claim 1 wherein said stator sealing ring has an axial length at least twice a radial width thereof.

9. The assembly defined in claim 1 wherein said end face of said stator sealing ring is composed of at least two annular surfaces adjoining at an annular edge.

10. The assembly defined in claim 1 wherein said end face of said stator sealing ring is composed of at least two frusto-conical annular surfaces adjoining at an annular peaked edge.

* * * * *